(12) United States Patent
Williams

(10) Patent No.: US 8,730,518 B2
(45) Date of Patent: May 20, 2014

(54) APPLICATION OF COLOR IMAGERY TO A REWRITABLE COLOR SURFACE

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 291 days.

(21) Appl. No.: 13/213,017

(22) Filed: Aug. 18, 2011

(65) Prior Publication Data

US 2013/0046324 A1 Feb. 21, 2013

(51) Int. Cl.
*G06K 15/10* (2006.01)
*G09G 3/34* (2006.01)
*G06K 7/10* (2006.01)

(52) U.S. Cl.
USPC ....... 358/1.8; 345/107; 235/472.01; 250/557; 250/559.4; 382/276; 128/899

(58) Field of Classification Search
USPC ....... 358/1.8; 345/107; 235/472.01; 128/899; 250/557, 559.4; 382/276
See application file for complete search history.

(56) References Cited

U.S. PATENT DOCUMENTS

| | | | |
|---|---|---|---|
| 4,429,478 A | | 2/1984 | Bruce-Sanders |
| 4,459,604 A | * | 7/1984 | Kudelski et al. ............... 347/161 |
| 5,240,334 A | | 8/1993 | Epstein et al. |
| 5,311,208 A | | 5/1994 | Burger et al. |
| 5,578,813 A | * | 11/1996 | Allen et al. ................. 250/208.1 |
| 5,644,139 A | | 7/1997 | Allen et al. |
| 5,825,044 A | | 10/1998 | Allen et al. |
| 5,927,872 A | | 7/1999 | Yamada |
| 6,192,890 B1 | * | 2/2001 | Levy et al. ..................... 128/899 |
| 6,233,368 B1 | | 5/2001 | Badjal et al. |
| 6,312,124 B1 | * | 11/2001 | Desormeaux ................. 347/109 |
| 6,392,678 B2 | | 5/2002 | Nakamura et al. |
| 6,704,133 B2 | * | 3/2004 | Gates et al. ..................... 359/296 |
| 6,806,453 B1 | | 10/2004 | Vincent et al. |
| 6,864,875 B2 | * | 3/2005 | Drzaic et al. .................. 345/107 |
| 6,982,178 B2 | * | 1/2006 | LeCain et al. .................... 438/22 |
| 7,012,600 B2 | * | 3/2006 | Zehner et al. ................. 345/214 |
| 7,075,502 B1 | * | 7/2006 | Drzaic et al. .................... 345/55 |
| 7,108,370 B2 | | 9/2006 | Breton |
| 7,167,155 B1 | * | 1/2007 | Albert et al. .................. 345/107 |
| 7,619,608 B2 | * | 11/2009 | Lee et al. ....................... 345/107 |
| 8,083,422 B1 | * | 12/2011 | Simmons et al. ............... 400/62 |
| 8,090,224 B2 | * | 1/2012 | Lapstun et al. ............... 382/312 |
| 8,096,713 B1 | * | 1/2012 | Bledsoe et al. ................. 400/62 |
| 8,102,362 B2 | * | 1/2012 | Ricks et al. .................... 345/105 |
| 8,139,050 B2 | * | 3/2012 | Jacobson et al. ............. 345/204 |

(Continued)

OTHER PUBLICATIONS

Alex Breton, "A Magic Wand for Printing," Popular Science, Jun. 2011, p. 54.

*Primary Examiner* — Houshang Safaipour
*Assistant Examiner* — Walter Yehl
(74) *Attorney, Agent, or Firm* — Eric A. Gifford

(57) ABSTRACT

Printing of color imagery onto a rewritable color surface is accomplished by providing an applicator with an alignment subsystem capable of sensing an alignment marker of one or more colors dots from multiple local color dot patterns as the applicator scans the surface to align the applicator's print head to the local color dot patterns. The alignment subsystem uses the sensed alignment markers to determine an absolute position on the rewritable color surface at a resolution of the individual color dots in the local color dot pattern and to align the state values for the corresponding portion of the color image to the individual color dots in the local color dot patterns on said surface.

13 Claims, 8 Drawing Sheets

(56) References Cited

U.S. PATENT DOCUMENTS

| | | | |
|---|---|---|---|
| 8,289,250 B2* | 10/2012 | Zehner et al. | 345/87 |
| 8,289,352 B2* | 10/2012 | Vartanian et al. | 347/110 |
| 2002/0070988 A1* | 6/2002 | Desormeaux | 347/8 |
| 2002/0070997 A1* | 6/2002 | Nakagawa et al. | 347/37 |
| 2003/0231374 A1* | 12/2003 | Vincent et al. | 359/321 |
| 2004/0064036 A1* | 4/2004 | Mao et al. | 600/413 |
| 2006/0012562 A1* | 1/2006 | Pope et al. | 345/156 |
| 2006/0050131 A1 | 3/2006 | Breton | |
| 2006/0061647 A1 | 3/2006 | Breton | |
| 2006/0165460 A1 | 7/2006 | Breton | |
| 2006/0275068 A1 | 12/2006 | Breton | |
| 2008/0273748 A1* | 11/2008 | Meiring et al. | 382/100 |
| 2010/0245221 A1* | 9/2010 | Khan | 345/87 |
| 2013/0125910 A1* | 5/2013 | Bansal | 132/200 |

* cited by examiner

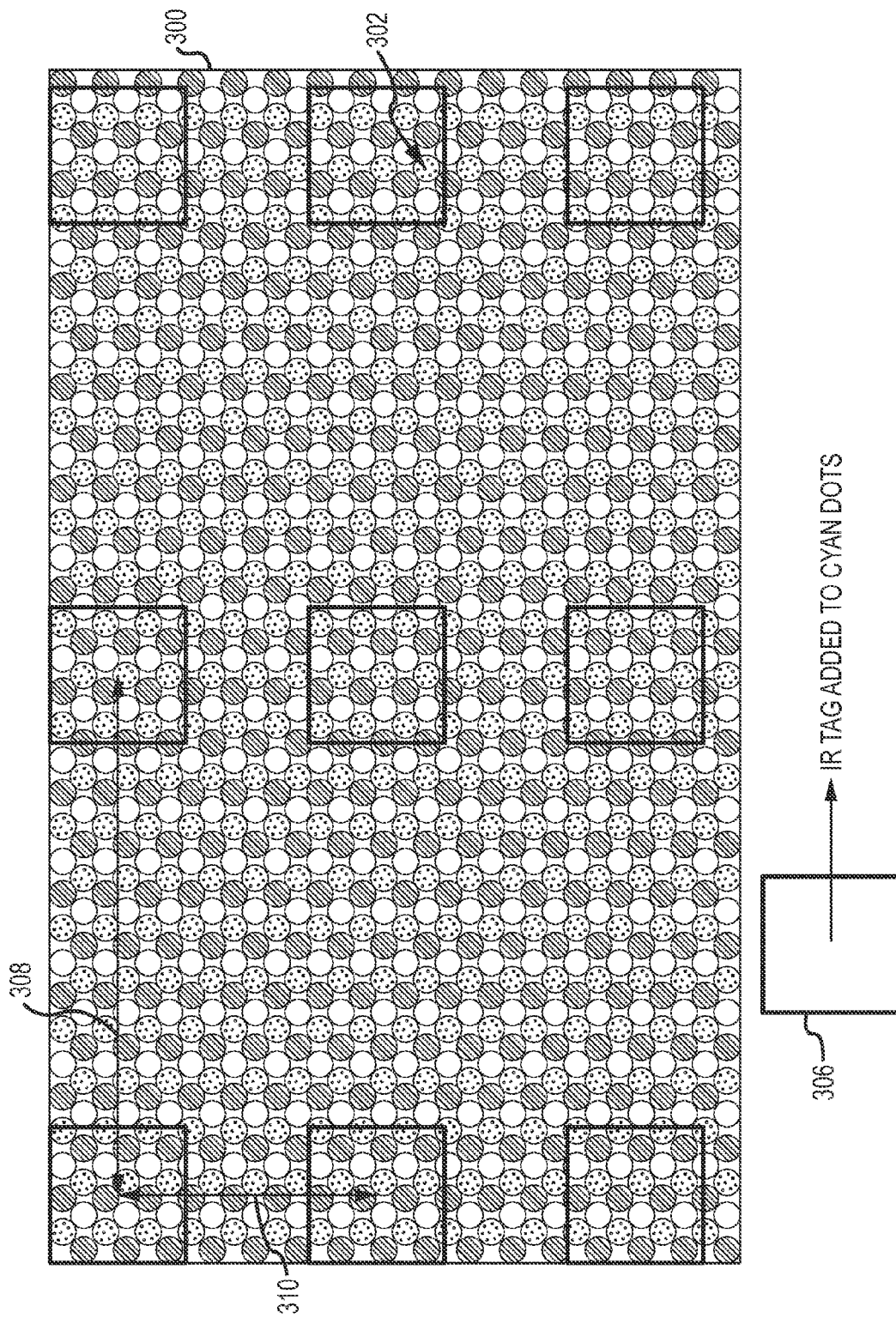

APPLICATION OF COLOR IMAGERY TO A REWRITABLE COLOR SURFACE

BACKGROUND OF THE INVENTION

1. Field of the Invention

This invention relates to the application of color imagery to a rewritable color surface.

2. Description of the Related Art

Electronic paper is a display technology designed to mimic the appearance of ordinary ink on paper. Unlike conventional backlit flat panel displays, electronic paper displays reflect light like ordinary paper. Many of the technologies can hold text and images indefinitely without using electricity, while allowing the text and images to be periodically updated. Electronic paper may be implemented using different technologies, the most common being electrophoretic ink.

In the simplest implementation of an electrophoretic display, titanium dioxide (titania) particles approximately one micrometer in diameter are dispersed in hydrocarbon oil. A dark-colored dye is also added to the oil, along with surfactants and charging agents that cause the particles to take on an electric charge. This mixture is placed between two parallel, conductive plates separated by a gap of 10 to 100 microns. When a voltage is applied across the two plates, the particles will migrate electrophoretically to the plate bearing the opposite charge from that on the particles. When the particles are located at the front (viewing) side of the display, the display appears white, because light is scattered back to the viewer by the high-index titania particles. When the particles are located at the rear side of the display, the display appears dark, because the incident light is absorbed by the colored dye. If the rear electrode is divided into a number of small picture elements (pixels), then an image can be formed by applying the appropriate voltage to each region of the display to create a pattern of reflecting and absorbing regions. Segmentation of the rear electrode into multiple sub-pixels facilitates modulation techniques to achieve multiple gray levels per pixel. A color display may be implemented using a local dot pattern of color filters or color dyes. Typical color displays may be RGB, CMY or CMYK. Electrophoretic displays are considered prime examples of the electronic paper category because of their paper-like appearance and low power consumption.

E Ink Corporation manufactures i a particular type of electrophoretic display in which the titanium dioxide and black dye are encapsulated in microcapsules suspended in a layer of liquid polymer (see U.S. Pat. No. 6,124,851). The Sony Reader and Amazon Kindle are examples of electronic books that use electrophoretic displays developed by E Ink Corporation. The current Sony Readers and Amazon Kindle use the E Ink Pearl display having a resolution of 600×800 to 600×1024 pixels with 16-level gray scale. The display uses an embedded active matrix TFT (thin film technology) to write the voltages to each pixel to update the display. Electrophoretic displays have a relatively slow refresh rate as compared to LCDs, however once the pixel has been written the voltage can be removed and the pixel state will persist.

The E Ink Triton imaging film is a color active matrix display that is capable of displaying thousands of colors in addition to the 16 levels of monochrome. A thin transparent color filter array (CFA) is added in front of the black and white display. The CFA consists of a red, green blue and white sub-pixel. E Ink envisions applications of the triton imaging film in color eBooks, e Textbooks, eNewspapers and eMagazines and electronic signage.

Xerox® Gyricon™ is a field rotatable bichromal colorant sphere. (see U.S. Pat. Nos. 4,126,854, 4,143,103, 5,389,945 and 5,604,027). Each sphere has a bichromal ball having two hemispheres of contrasting colors, e.g. black and white, red and white, each having different electrical properties. Each ball is enclosed within a spherical shell and a space between the ball and shell is filled with a liquid to form a microsphere so that the ball is free to rotate in response to an electrical field. The microspheres are mixed to form a film. An active matrix array may be used to update the display.

U.S. Pat. No. 6,806,453 to Kent D. Vincent et al. describes a hand-held scan-print device that is scanned over a surface of a paper-like rewritable sheet such as E Ink's film or Xerox® Gyricon™. The sheet has a colorant responsive to a linear array of pixel-sized electric fields written over the sheet by the scan-print device during each scan, producing a bistable pixel (e.g., black or white) in response to field polarity. A scanning navigation subsystem positions the black and white data on the sheet (See U.S. Pat. No. 5,825,044 to Allen et al.). Once a series of scans sufficient to cover the entire sheet has been made, the printed image appears as if printed conventionally. The print remains stable until reprinted or intentionally erased.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for printing of color imagery onto a rewritable color surface. The surface may, for example, comprise a color electrophoretic display or human skin tattooed with electrophoretic ink. Unlike the printing of black and white imagery onto a rewritable black and white surface that requires only the positioning and gross orientation of the hand-held printer, the printing of color imagery onto a rewritable color surface further requires precision alignment of the color data to the individual color dots that make up the color surface.

This is accomplished with an applicator for printing a color image onto a rewritable color surface including a global pattern of a local color dot pattern. The applicator comprises a memory that stores a color image including state values for the color dots, a first print head including multiple heads that produce localized energy, a navigation subsystem for positioning the applicator within the global pattern and an alignment subsystem for sensing an alignment marker of one or more color dots from multiple local dot patterns across the current scan. These alignment marks may, for example, be the visible color response of the individual dots, either in their existing persistent state or a controlled on state, a non-visible response to a tag agent in the individual dots, or a secondary emission response to a stimulus. The alignment markers may occur in every dot or a subset of dots in the local pattern. The alignment markers may occur in every local pattern or may be grouped in a sub-sampled spacing across and a long a scan.

During a scan, the navigation subsystem positions the applicator and determines the state values for a corresponding portion of the color image. The alignment subsystem uses the alignment markers to align these state values to the individual color dots on the surface. Alignment may be achieved by mapping the state values for a particular color dot in the color image to an individual head that is aligned to a particular color dot or by micro-actuating a pattern of print heads with pre-assigned state values to align with the local color dot patterns. The print head then applies the localized energies associated with the aligned state values to the individual dots to print the color image.

In an embodiment, the rewritable color surface comprises an electrophoretic display having a bistable, electrochromic, colorant susceptible to localized electric fields. Color may be achieved using different color dyes for the individual dots or by using a black and white display with a color filter.

In an embodiment, the rewritable color surface comprises a canvas of human skin tattooed with color electrophoretic ink to define the global pattern. The skin may be scanned prior to tattooing to define a baseline skin template for controlling the boundaries around the printed color image or to erase any such images to approximately match the original skin color and texture. The tattooed global pattern may be scanned prior to printing the color image to define a template for alignment correction.

In an embodiment, the rewritable color surface lacks internal addressing to produce the localized energy to change the persistent state of the individual color dots to print a color image on the surface.

In an embodiment, a hand-held applicator (human or mechanical) moves over the surface to apply the color image. In another embodiment, the applicator is adapted for use in a printer or copier in which the rewritable color surface is fed through the printer or copier. The applicator may be fixed or move on a translation stage orthogonal the feed.

In an embodiment, the navigation system uses the alignment markers to determine in whole or in part the position of the applicator.

In an embodiment, the applicator comprises the first print head and a second print head separated by a visible band sensor. The second print head passes over and applies energy to at least some of the local dot patterns to change their persistent state to a nominal on state to establish the alignment markers. The second print head may turn on all of the dots or may turn on groups of local dot patterns at a specified first sub-sampling spacing across the scan and a specified second sub-sampling interval along the scan. The visible band sensor then passes over and senses the local dot patterns in the nominal on state to align the first print head to the local dot patterns beneath the first print head. The first print head then passes over and applies energy to the local dot patterns to change the state of the corresponding color dots for the portion of the color image.

In an embodiment, the applicator comprises a sensor and the first print head. The sensor senses the visible color response of the individual dots in their existing persistent state, a non-visible response of a tag agent in the dots or a secondary emission response from a stimulus as the alignment markers to align the first print head to the local dot patterns beneath the first print head. The first print head then passes over and applies energy to the local dot patterns to change the state of the corresponding color dots for the portion of the color image.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 6 is a diagram of a rewritable surface in which an IR tag agent has been added to groups of blue dots at a sub-sampling spacing across and along the scan.

DETAILED DESCRIPTION OF THE INVENTION

Figure 1:
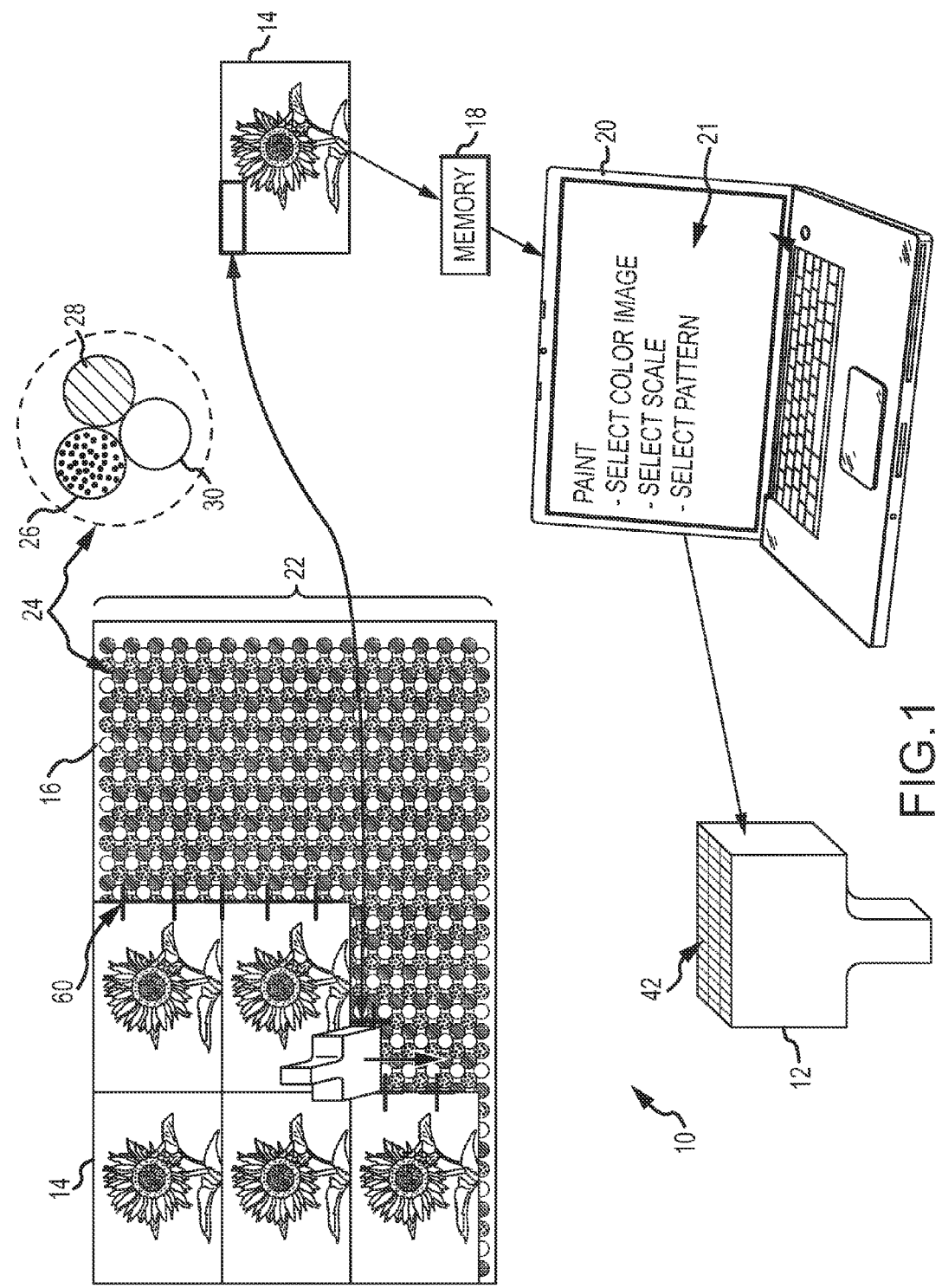
FIG. 1 is a diagram of a hand-held applicator and method of printing color imagery to a rewritable color surface.

Unlike the printing of black and white imagery onto a rewritable black and white surface that requires only the positioning and gross orientation of the applicator, the printing of color imagery onto a rewritable color surface requires precision alignment of the color data to the individual color dots that make up the surface. U.S. Pat. No. 6,806,453 mentions that the molecular colorant coating comprises a mosaic pixel pattern of primary color pixels such that full color printing is produced by the electrode subsystem on the media but fails to appreciate the alignment problem and does not teach a printer or method of use to effectively print color imagery onto a rewritable color display. If black and white data is shifted by a dot or two the black and white image is still printed onto the surface. If color data is shifted by a dot or two, for example mapping cyan data to yellow dots and yellow data to magenta dots, the color of the printed image will be incorrect.

The present invention provides printing of color imagery onto a rewritable color surface with an applicator (hand-held or printer/copier) having an alignment subsystem capable of sensing one or more alignment markers (color response, non-visible response or secondary emission) of colors dots from multiple local color dot patterns as the applicator scans the surface to align the applicator's print head to the local color dot patterns. The alignment subsystem uses the sensed alignment markers to align the color data for the corresponding portion of the color image to the individual color dots on the surface. Alignment may be achieved by mapping the color data for a particular color dot to a print head that is aligned to a particular color dot or by micro-actuating a pattern of print heads with pre-assigned color data to align with the local color dot patterns.

As used herein, a rewritable color surface includes a global pattern (e.g. periodic, quasi-periodic or random) of a local color dot pattern. The local color dot pattern comprises two or more different color dots e.g. RGB, CMY, CMYK etc. The different color dots may be, for example, provided by using different color pigments within the microcapsules or microspheres or by using black/white pigments with a color filter such as the CFA. The color dots subtract wavelengths from white light according to a "subtractive color model" giving the light the color that is perceived by the viewer. RYB (Red, Yellow, Blue) is the original standard set of subtractive primary colors. CMY (Cyan, Magenta, Yellow), which are the complements of RYB, is the current standard set of subtractive primary colors for color printing. Cyan acts like a filter that absorbs Red. The amount of Cyan controls how much Red is perceived by the viewer. Combinations of different amounts of the three pigments can produce a wide range of colors. Often an under-toning of black ink (e.g. a fourth black dot referred to as the "key" or "K") is used. This is called CMYK. Ambient light or light from an emissive source is typically reflected off a white background and filtered by the color dots. In a "paper-like" display, the surface material suitably provides a haptic resemblance to plain paper. The surface may be adapted to filter light transmitted through the surface. The surface is suitably but not necessarily formed of flexible material so that may, for example, be provided in rolls and unrolled onto a flat surface or made to conform to a curved surface.

The surface is responsive to the localized application of energy (e.g. electrical field, thermal or optical) to change a persistent state of individual color dots to change the amount of C, M or Y to control the amount of R, Y or B perceived. When the energy is removed, the state of the color dot persists until changed. Multiple color levels (e.g. different amounts of C, M or Y) are achievable for each color dot using standard gray scale techniques. For example, an image pixel may comprise multiple binary display pixels. The application of dithering and half-toning techniques to these binary display pixels will produce multiple color levels for an individual color dot.

The rewritable color surface does not require, and generally lacks internal addressing (such as the segmented pixel electrode and active matrix addressing) to produce the localized energies to change the persistent state of the individual color dots to print a color image on the surface. Accordingly the surface need not embody the manufacturing cost of internal addressing.

For describing the embodiments of the present invention, a generic rewritable color surface that includes a global pattern of local color dot patterns that are responsive to localized energy to change their persistent state to provide a perceived color will be used. However, it will be recognized by those skilled in the art that the applicator may be adapted to work with a wide variety of rewritable electronic color print media including but not limited to E Ink or Xerox microsphere devices. In those technologies the rewritable medium comprises a bistable, electrochromic, colorant susceptible to localized electric fields to change the bistable state of the microspheres. The applicator may be adapted to work with a surface formed by tattooing the global pattern of local color dot patterns into human skin with electrophoretic ink. Other rewritable color surfaces may now or in the future exist that use a colorant that is defined by a technology other than bistable microspheres and/or that is responsive to localized energy other than electric fields to which the present invention is applicable. The present invention is directed to the alignment of the color data to the individual color dot patterns independent of the particular technology used to provide the rewritable color surface.

Without loss of generality, the invention will be described for a hand-held applicator. One skilled in the art will recognize that the applicator may be adapted for use with printers or copiers for printing color imagery onto rewritable color paper.

Figure 2:
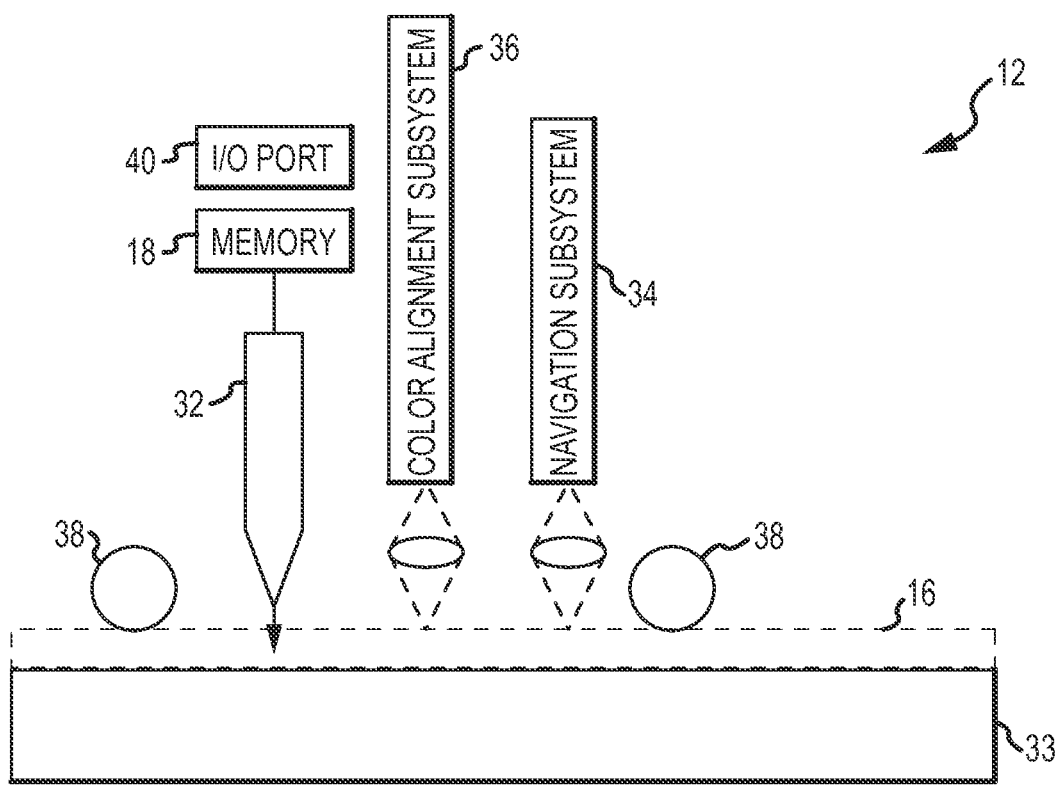
FIG. 2 is a schematic diagram of an embodiment of the applicator.
Figure 3:
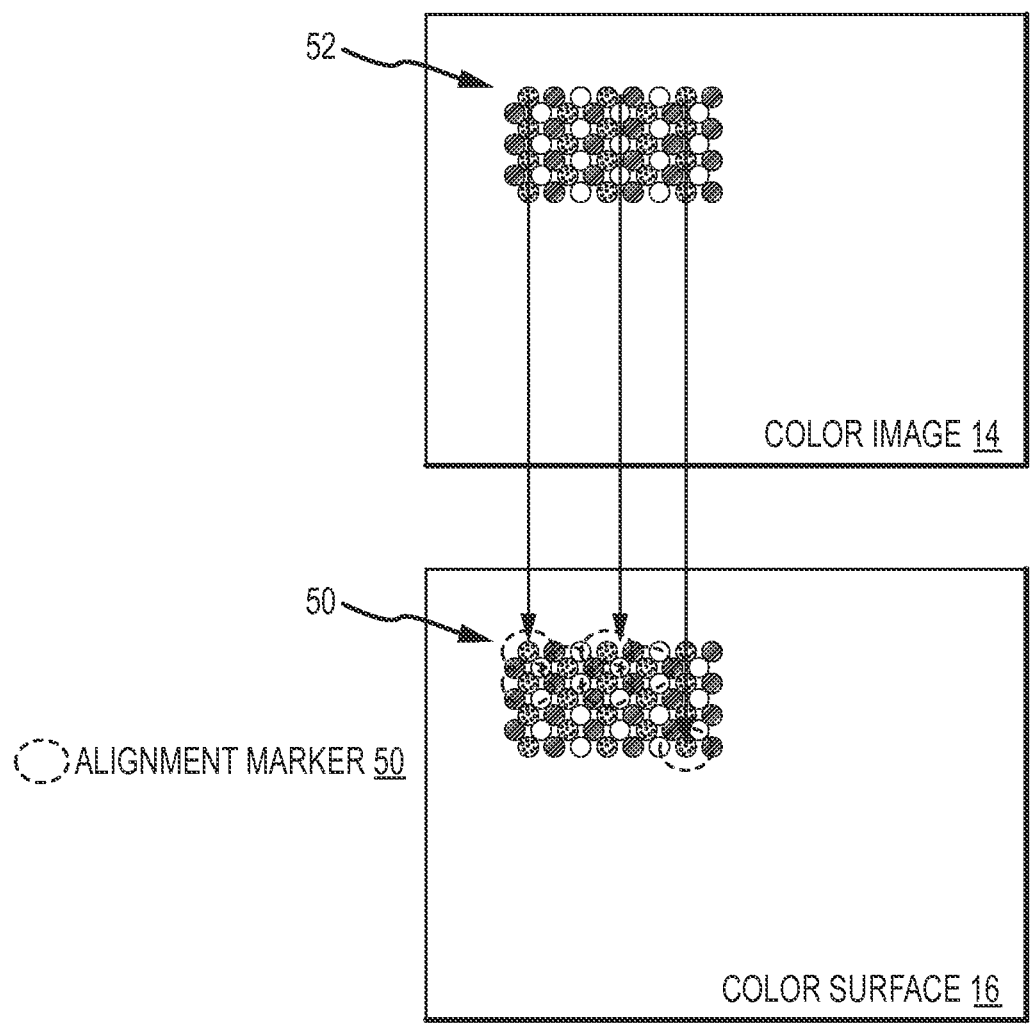
FIG. 3 is a diagram illustrating the use of alignment markers to align the color data to the individual color dots on the surface.

Referring now to FIGS. 1 through 3, an embodiment of a system 10 for the application of color imagery comprises a hand-held applicator 12 designed to print a color image 14 on a rewritable color surface 16. Applicator 12 may be "hand-held" by a human hand or a mechanical hand (e.g. a mechanical crawler that can move freely over the surface to print the color image). One or more color images 14 are suitably stored in memory 18 in a computer 20 for selection and transfer to applicator 12 via a wired USB connection, wireless network or a memory stick, for example. Computer 20 is suitably configured to present a user interface 21 that facilitates selection of a desired color image and application of that image to the surface. The user interface may also allow the user to specify the dimensions of the surface 16 and specify the pattern with which the image will be printed (e.g. scale one color image to fit or "wallpaper" the surface with a fixed size color image as depicted). It will be recognized by those skilled in the art that the user interface may be adapted to provide a variety of other menu options to facilitate a user-friendly experience. For example, the interface may provide step-by-step instructions for printing the color image onto the surface, may display the current state of the printed image on the surface via a wireless connection with the applicator and so forth.

Rewritable color surface 16 includes a global pattern 22 (e.g. periodic, quasi-periodic or random) of multiple local color dot patterns 24. In this embodiment, the local dot pattern is CMY. The CMY pattern includes three color dots; C 26, M 28 and Y 30. Each color dot is responsive to the selective application of energy to change its persistent state (and the amount of color in that dot) and subtract wavelengths from white light to provide a perceived color to display color image 14. For CMY, the color data stored in memory 18 for each color image 14 includes a state value for each C, M and Y sub-pixel for each pixel in the image. To correctly print color image 14 onto color surface 16 the pixels must not only be correctly positioned on the surface but the sub-pixel data must also be correctly aligned to the local color dot patterns on the surface.

Referring now to FIG. 2, applicator 12 comprises a print head array 32 to apply localized energies to multiple local dot patterns on color surface 16 on a flexible substrate 33, a surface navigation subsystem 34 for positioning the applicator within the global pattern and determining the state values to retrieve from memory 18 for a corresponding portion of the color image on the surface and an alignment subsystem 36 for sensing an alignment marker of one or more color dots from multiple local dot patterns across the current scan and using the sensed alignment markers to align the retrieved state values for the corresponding portion of the color image to the individual color dots in the local color dot patterns on said surface. The applicator is suitably designed to be hand-held by a user. The applicator may be implemented in a variety of shapes and sizes. These components are commonly housed such that the hand-held applicator is easily scanned over the rewritable color surface to print the color. To facilitate motion over the surface, rollers 38 may be provided. An I/O port 40 can be provided for wired, wireless or plug-in communications with the computer. The applicator may also include one or more features including but not limited to a brake to prevent over-speed in applicator motion, a display, and one or more inertial sensors to identify applicator lifts from the surface and left-to-right and top-to-bottom motion.

The print head 32 comprises an array of individual heads 42 as shown in FIG. 1. Individual print heads may be larger, smaller or of approximately the same size as the surface sub-pixels. The print heads may be arranged linearly with individual rows aligned to each other or in a staggered relationship. The array may be fixed or movable, driven by one or more micro-actuators.

The heads 42 produce localized energy that when applied to the surface set the persistent state of a color dot. Depending upon the configuration of the display and the technique used to achieve a wide spectrum of colors, a single head 42 may set the persistent state of a color dot in the image or multiple heads 42 may set the persistent states of respective display dots that together set the persistent state of the color dot. The individual heads 42 are responsive to the state values of the color data to determine the localized energy that is applied. When the energy is removed, the state of the color dot persists.

In an embodiment in which the rewritable color surface is an electrophoretic display that comprises a bistable, electrochromic, colorant (e.g. colored pigments or a colored filter array) susceptible to localized electric fields to change the bistable state of the microcapsules, the print head includes an electrode array of individual electrodes. Electrode arrays and drive electronics are common to electrostatic printers and their constructions and interfaces are well known. For example, Sheridon in U.S. Pat. No. 5,389,945, Feb. 14, 1995, describes an electrode array printer for printing on re-writable paper. Each electrode is sized, positioned, and electrically addressed in a known manner to provide an appropriate electric field to the colorant layer at each given sub-pixel location along a pixel column (or columns if a staggered array) of the rewritable color surface. The electrodes may be configured to produce perpendicular or parallel "fringe fields" with respect to the surface so that printing is accomplished by passage of fringe fields through the colorant. The field is concentrated under the electrode tip and the return field is dispersed and therefor does not affect the colorant layer. The print head array in combination with the colorant can produce a pixel resolution of at least 1200 dots per inch.

The surface navigation subsystem 34 determines the applicator's position and angular orientation to the surface to determine the state values for a corresponding portion of the color image to be printed onto the surface. One skilled in the art will recognize that techniques for positioning hand-held devices within an image are well known. Odometry is the use of data from moving sensors to estimate change in position over time. Assuming that the applicator prints the color image top-to-bottom and left-to-right in overlapping scans, the applicator may for example estimate the position along a current scan by counting the rotation of roller 38. The applicator initializes position at the top of each subsequent scan by correlating the color data for the current scan with the overlapping color data printed for the last scan. Pure odometry is sensitive to the accumulation of error over time along the scan. Odometry may be enhanced by optically monitoring position markers that are pre-printed onto the surface in for example a rectilinear pixel grid at a specified interval. These markers may be faint visible markers, IR or UV. The alignment navigation subsystem includes a sensor that senses the position markers to determine the position and angular orientation of the applicator. Some error may accumulate between the pre-printed markers. See Vincent and Allen supra.

The alignment subsystem 36 aligns the retrieved state values for the corresponding portion of the color image to the individual color dots in the local color dot patterns on said surface. Referring now to FIG. 3, subsystem 36 performs this alignment by sensing an alignment marker 50 of one or more color dots from multiple local dot patterns across the current scan of color surface 16. The alignment markers may be physically coincident with or in a pre-determined relationship with the one or more color dots and in combination provide a unique indicator of the arrangement of the color dots in the local color pattern. For example, a scan for an applicator 3" in width with a print resolution of 1200 dpi is approximately 3,600 dots. The alignment markers may occur in every dot or a subset of dots in the local pattern (e.g. just the cyan dot). The alignment markers may occur in every local pattern or may be grouped in a sub-sampled spacing across and a long a scan (e.g. groups of ten local dot patterns spaced every fifty local dot patterns). Subsystem 36 processes the pattern of alignment markers to align the state values for the color data 52 of color image 14 to the individual color dots of color surface 16.

These alignment marks may, for example, be the visible color response of the individual dots, either in an their existing persistent state (e.g. a nominal off state or assigned state for a previous color image) or a controlled nominal on state, a non-visible response to a tag agent in the individual dots, or a secondary emission response to a stimulus.

The alignment subsystem 36 may include a visible band sensor with sufficient spatial resolution to sense the individual color dots. In one embodiment, the dots are sensed "as is" in their existing persistent state. This persistent state may be a nominally off state or may be any state printed by a previous color image. To ensure adequate performance, this configuration may be designed based on the assumption that the dots are in a nominally off state, and thus present a minimal, but non-zero, color contrast with the white background. The visible band sensor suitably has sufficient resolution to resolve spaces between individual dots in order to sense the different colors of the dots. In another embodiment, the applicator is configured apply localized energy to turn on the selected dots that provide the alignment markers. With the color dots in their nominally on state, the visible band sensor requires less spatial resolution to sense the individual color dots.

The dots that provide the alignment markers may include a tag agent that exhibits a non-visible (e.g. IR or UV) response. The tag agent may occur naturally with one or more of the color pigments or may be included as an additive at manufacture. Different color dots may include different tag agents that exhibit different non-visible responses. Within a given dot, the tag agent may occur in only one pigment or in both pigments (e.g. black and white, cyan and white, etc.). The alignment subsystem comprises a sensor that is responsive to the non-visible response of the tag agent.

The dots that provide the alignment markers may be subjected to a stimulus that produces a secondary emission from the dots. The stimulus may be visible or non-visible and the secondary emission may be visible or non-visible. For example, a UV source may provide deep UV illumination of the pigments that produces a UV florescence. The alignment subsystem comprises a source to stimulate the dots and a sensor that is responsive to the secondary emission.

Referring back to the surface navigation system 34, the known techniques for determining the position and orientation of the applicator may be augmented by using the alignment markers (e.g. the individual color dots) and/or position markers laid down by the applicator. The alignment markers may be used in place of the position markers positioned on the surface or to provide higher resolution markers to augment those position markers. Similarly, the position markers laid down by the applicator during the current scan may be used in place of the position markers positioned on the surface or to provide higher resolution markers to augment those position markers in the next scan.

Referring back to FIG. 1, in an exemplary embodiment to print the color image 14 onto rewritable color surface 16 a user may affix the surface 16 to a wall, billboard or some other physical surface or not. The user may select a particular color image and specify the scale for printing the color image 14 to color surface 16 and the pattern to cover the extent of surface 16 (e.g. scale to fit or wallpaper). The color data is then transferred to applicator 12. The color data transferred may be a 1-to-1 mapping of data for the entire pattern to the color dots (or finder resolution display dots). Alternately, the color data for just a color image along with the pattern instructions may be transferred to the applicator, which in turn creates the 1-to-1 mapping of color data to the surface.

The user may proceed to use applicator 12 to print the pattern of color images 14 onto surface 16 in a series of top-to-bottom, left-to-right overlapping scans. Other scan patterns, overlapping or not, can be used to print the pattern. As the user moves applicator 12 down the current scan the navigation subsystem positions the applicator within the pattern, hence color image 14 and determines the state values for a corresponding portion of the color image on the surface. The alignment subsystem senses and processes alignment markers to align the state values for the corresponding portion of the color image to the individual color dots in the local color dot patterns on the surface. Once aligned, the applicator's print head applies localized energies associated with the aligned state values to the individual dots to print the color image. This process is repeated as the user moves applicator 12 down the current scan and onto the next scan. As shown, the print head prints position markers 60 at regular intervals along the right edge of the current scan. During the next scan, the navigation system senses position markers 60 and uses them to determine the position of the applicator. Each column of position markers is overwritten by the next scan. Printing of the markers is disabled for the final scan.

If there is a physical barrier at the edges of the surface (e.g. a ceiling or wall or frame), there may be a start-up issue printing into the first corner and for printing the extreme edges. If for example the user is printing the color imagery onto a wall and starts in the top-left corner bordered by the ceiling and the wall the applicator's alignment subsystem and print head may not read the extreme top edge. One solution is to print the color imagery in the top-to-bottom, left-to-right scan pattern. Once complete, the user can move the applicator backwards into the edge to fill in the missing color data.

For at least electrophoretic surfaces, because the color dots may be overwritten with the same localized energy without changing its persistent state, the surface does need to be erased before printing a color image and the printed color image does not need to be conventionally "stitched" together. In other words, successive scans of the applicator over the same dots does not change the color of the dots provided that the field oriented by each electrode is of the same polarity with each scan. Thus, the applicator does not need to remember where it has printed and where it has not. This allows the user to print in overlapping scans without disrupting the color image. One may erase the persistent states of the color dots by setting the entire electrode array to a polarity the erases the color dots e.g. changes the dots state to white or transparent.

Another and quite unique application is to provide rewritable color tattoos printed onto human skin. In an embodiment, electrophoretic CYMK pigments are "tattooed" in a global pattern of the local CYMK pattern onto human skin to form the rewritable color surface. The global pattern may be tattooed onto the skin all at once to form a "canvas" that is then printed or in a sequence of smaller patches that are printed as you go to print the color tattoo. The CYMK pigments may be tattooed onto human skin using, for example, a tattoo applicator comprising a high-resolution needle array or high-pressure ink injector configured to inject the color electrophoretic pigments in the prescribed pattern. The colors of the pigments may be "feathered" towards the edges of the rewritable surface to maintain ink density in overlapping scans and to blend with the skin surrounding the tattoo. The CYMK pigments may use actual color pigments i.e. oppositely charged cyan (yellow, magenta and black) and white pigments within micro-capsules or black and white pigments with an embedded color filter in the covering of the micro-capsules. The natural electrical conduction of human skin provides the electrical backplane. Because the applied electric field determines the persistent state of the micro-capsules, hence color dots, the initial persistent state of the micro-capsules, hence color dots, tattooed onto the skin does not have to be uniform or well-controlled.

The skin may be scanned prior to tattooing to build a matching skin template that is stored in memory, possibly with embedded reference markers for navigation reference. The skin template may be used to print the matching skin texture and color on the rewritable surface outside the boundary of the printed color tattoo to resemble the original skin. The skin template may be used to print the entire rewritable color surface to resemble the original skin to effectively erase the tattoo.

Because the printed pattern on the human skin may not perfectly match the global pattern of color data, the printed pattern may be scanned to build and store in memory a matching pattern template. The alignment subsystem may use the pattern template to correct alignment of the color data to the individual print heads.

Otherwise the process for printing the color tattoo is the same. This approach would allow people to periodically rewrite their tattoos in color. The same tattoo could be reprinted at a later data to account for changes in the person's skin due to aging or changes in weight to maintain the proper look of the tattoo. A different tattoo could be printed on the surface defined on the human skin.

Figure 4A:
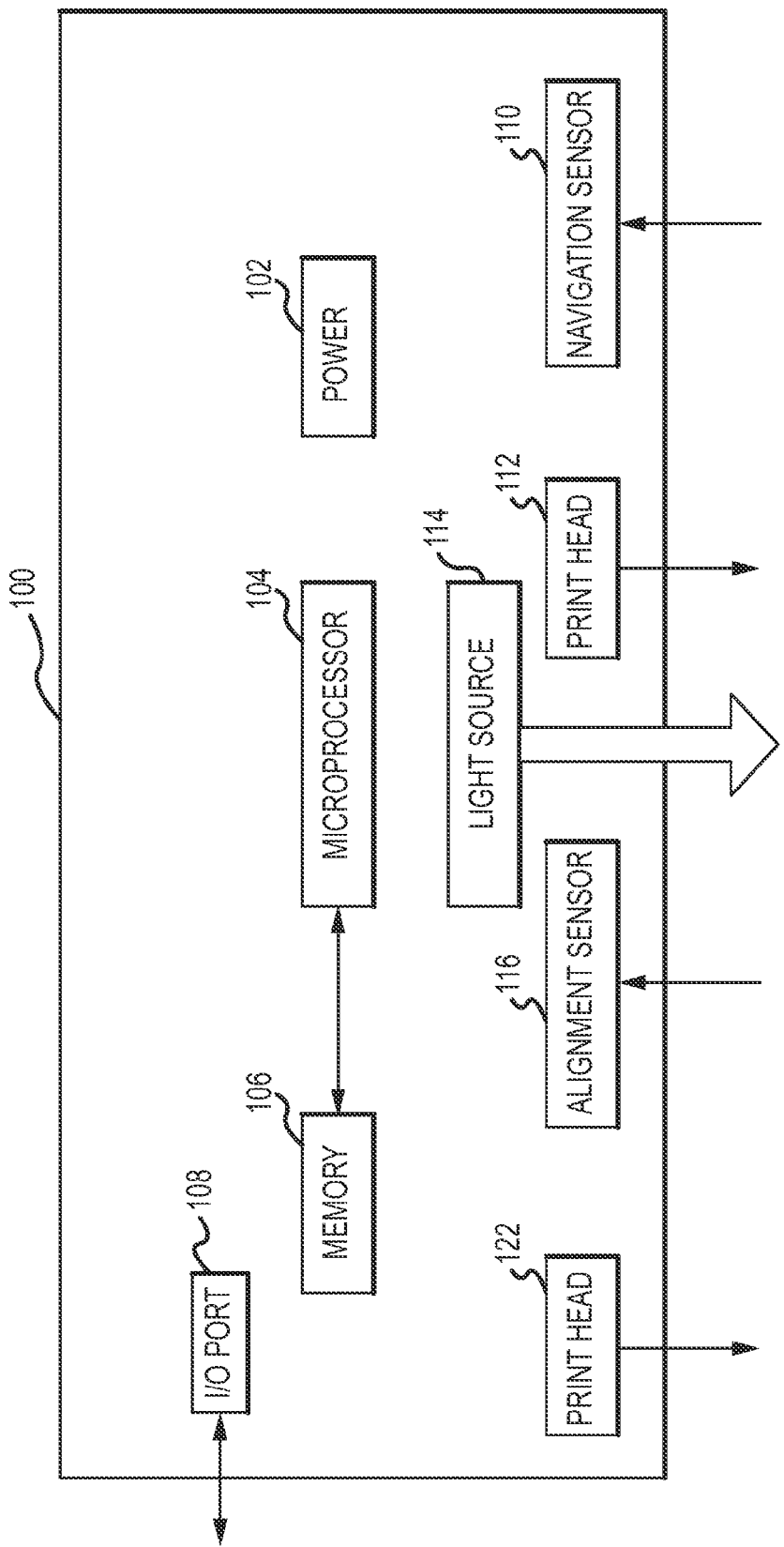
FIGS. 4a-4b are diagrams of an embodiment of an applicator in which a navigation sensor senses position markers printed during the previous scan to position the applicator and in which local color dot patterns are turned on in the scan direction to align the print head and then selectively turned off to print the color image.
Figure 4B:
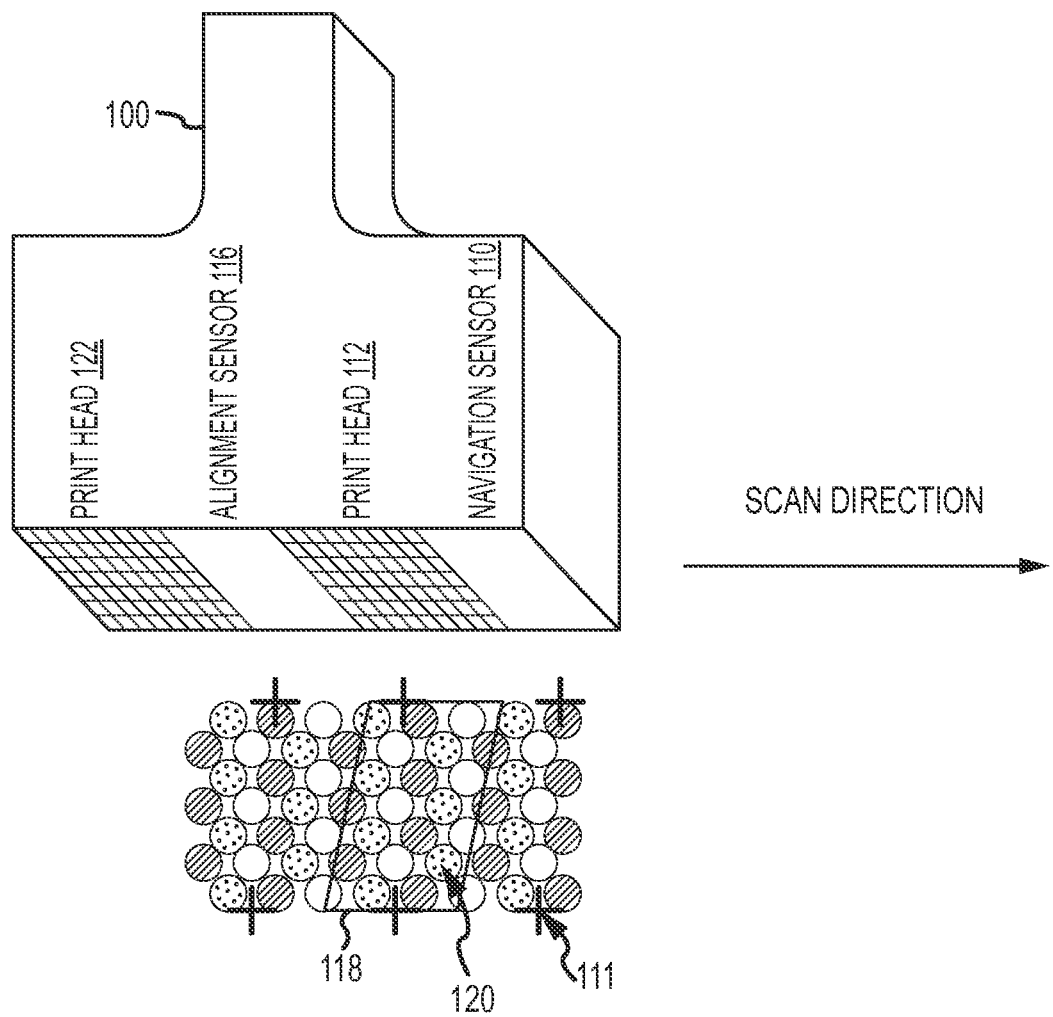

Referring now to FIGS. 4a and 4b, an embodiment of an applicator 100 includes electronics comprising power 102 (e.g. a battery or an external power cord), a microprocessor 104, memory 106 and an I/O port 108 for communication with a host computer. Together the electronics store the color data for the color image or pattern of color images and provide the computational resources for the navigation and alignment subsystems and the print head. Applicator 100 comprises a navigation sensor 110 that passes over and senses position markers 111 (either pre-printed on the surface or printed by the applicator in the previous scan) to monitor the position and orientation of the applicator in order to extract the state values for the corresponding portion of the color image. Applicator 100 further comprises a print head 112, a visible light source 114 and a visible-band alignment sensor 116, which together with the electronics provide the alignment subsystem. Print head 112 passes over and applies local energy to at least some of the local dot patterns 118 to change their persistent state to a nominal on state to provide alignment markers 120 (e.g. activated cyan dots). Alignment sensor 116 passes over and senses the alignment markers 120 to align the state values for the corresponding portion of the color image to the individual color dots in the local dot patterns 118. A print head 122 then passes over and applies localized energies associated with the aligned state values to the individual color dots to print the color image.

Figure 5A:
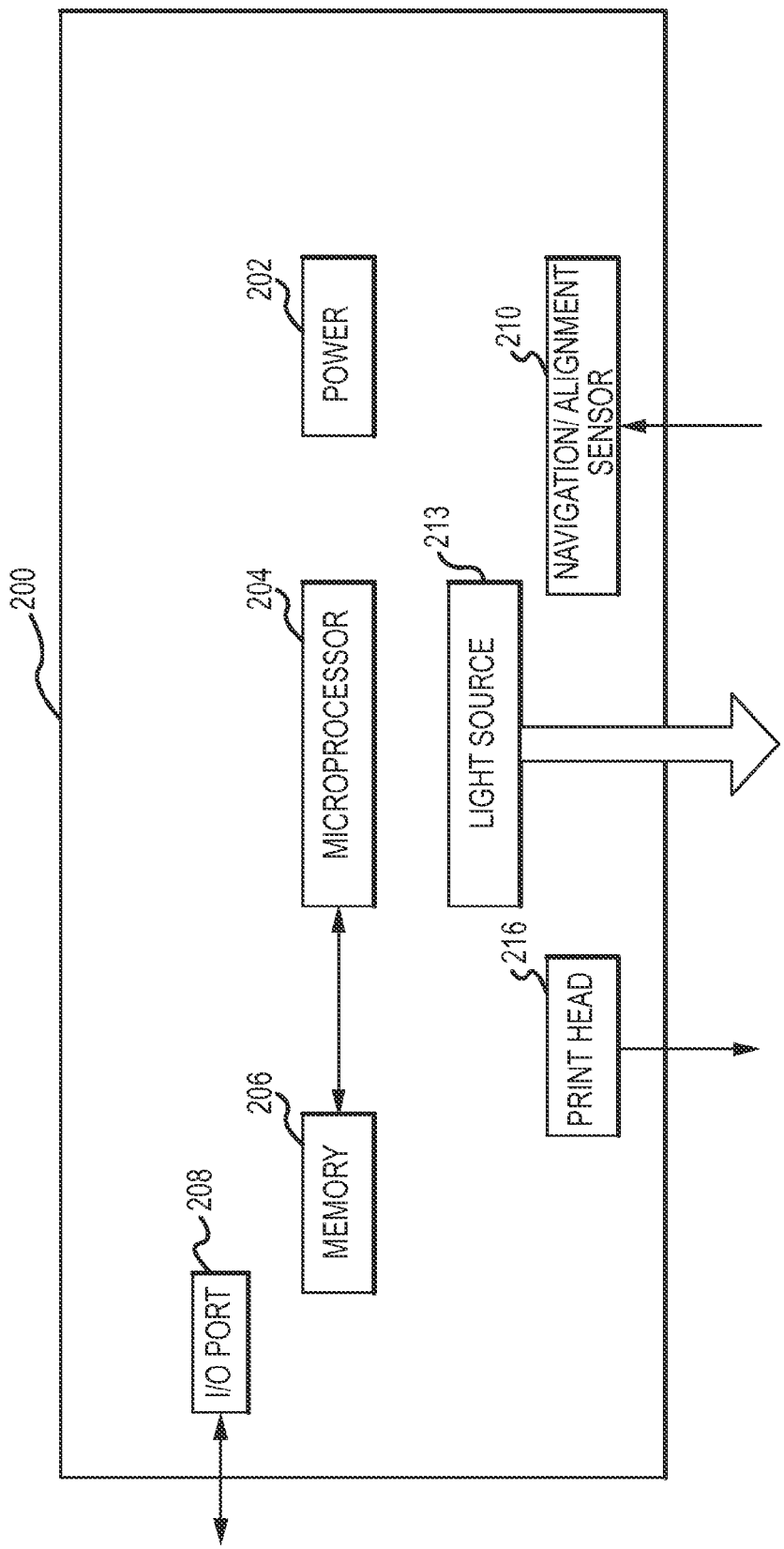
FIGS. 5a-5b are diagrams of an embodiment of an applicator in which a navigation/alignment sensor senses alignment markers to position the applicator and align the color data for the print head.
Figure 5B:
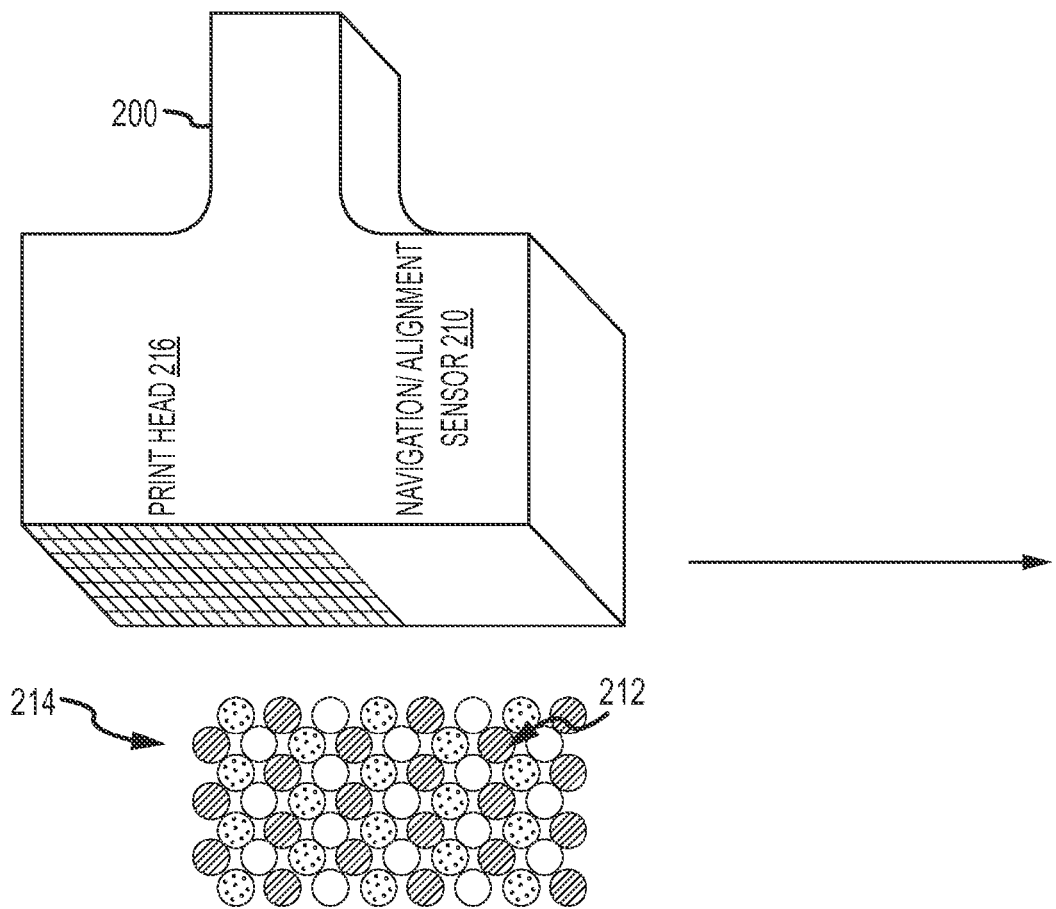

Referring now to FIGS. 5a and 5b, an applicator 200 includes electronics comprising power 202 (e.g. a battery or an external power cord), a microprocessor 204, memory 206 and an I/O port 208 for communication with a host computer. Together the electronics store the color data for the color image or pattern of color images and provide the computational resources for the navigation and alignment subsystems and the print head. Applicator 200 comprises a navigation/alignment sensor 210 positioned near its leading edge. Navigation sensor 210 passes over and senses alignment markers 212 (colors of individual dots in existing persistent state, non-visible response of a tag agent or secondary emission). A light source 213 may be used to reflect light off the surface to increase the color response of the dots or the non-visible response of the tag agent. In the case of secondary emission, source 213 provides the stimulus of the dots. The electronics process the alignment markers 212 to both position the applicator to extract the state values for the corresponding portion of the color image and to align the state values for the corresponding portion of the color image to the individual color dots in the local dot patterns 214. A print head 216 then passes over and applies localized energies associated with the aligned state values to the individual color dots to print the color image.

Referring now to FIG. 6, a color rewritable surface 300 is configured for use with applicator 200 configured to sense IR alignment markers 302. In this embodiment, an IR tag agent has been added to selected Cyan dots 304. Groups 306 of cyan dots 304 at sub-sampled intervals both across and along the scan direction have been tagged. The applicator's navigation/alignment sense senses the IR response of multiple Cyan dots 304 within each group 306 of multiple groups 306 across the scan. The applicator uses the sensed dots as position markers to determine the position of the applicator. Between groups of alignment markers, the applicator uses standard motion sensing to determine relative position to the last group of alignment markers and thus absolute position. Knowing the arrangement of the color dots in and CMY dot pattern, the applicator processes the pattern of alignment markers to align the state values to the individual dots. Between groups of alignment markers, the applicator uses motion sensing to estimate the alignment. The sub-sampling interval 308 between groups across the scan is selected so that the alignment for a given portion of the image is within a specified tolerance (e.g. <1 color dot). Similarly, the sub-sampling interval 310 between groups along the scan is selected so that the accumulated error in the alignment along the scan is within a specified tolerance (e.g. <1 color dot).

As previously mentioned, the system and method of aligning color data to the individual color dots of the rewritable color surface may be adapted for use with printers or copiers to print color imagery onto rewritable color paper. In these embodiments, the applicator is scanned over the rewritable color surface, at least in part, by moving the rewritable surface across the applicator. For example, rewritable color paper can be placed in a document feeder and pulled past the applicator. In a laser printer type configuration, the applicator is fixed and spans the entire width of the paper. As the paper is fed past the applicator, the applicator prints the color image. In an ink-jet type configuration, the applicator spans only a portion of the width of the paper. A translation stage moves the applicator across the paper as it is fed through to print the color image. The navigation system may comprise the conventional means used in laser or ink-jet printers to position the applicator in the global pattern to extract the corresponding color data. Alternately, the odometry techniques previously described for the hand-held applicator may be adapted for use with the printer including use of the alignment markers to augment navigation. In these embodiments the methods of alignment to the local color dot pattern may remain unchanged, or the concept of "marker" for identifying the positions of the color dots may be expended to include referencing to the edges of the rewritable surface.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of printing of a color image having a range of colors, comprising:
    providing a rewritable color surface, said surface including a global pattern of a local color dot pattern, said local color dot pattern comprising two or more different color dots in which at least a first said color dot includes a background colorant and a first colorant and a second said color dot includes the background colorant and a second colorant different from said first colorant, said surface responsive to the selective application of energy to change a persistent state of the amount of the corresponding color in individual color dots to provide a perceived color for each local color dot pattern;
    providing an applicator comprising a memory storing a color image including state values for the color dots, first and second print heads separated by a visible band sensor, each said print head including multiple heads that produce localized energy, and a navigation subsystem for positioning the applicator within the global pattern; and
    scanning the applicator over the rewritable color surface, said navigation subsystem positioning the applicator and determining the state values for a corresponding portion of the color image on said surface, said first print head first passes over and applies localized energy to at least some of the local dot patterns to change their persistent state to a nominal on state to provide alignment markers, said visible band sensor passes over and senses the alignment markers to determine an absolute position within the local color dot pattern on the rewritable color surface and to align the state values for the corresponding portion of the color image to the individual color dots in the local dot patterns on said surface, and said second print head then passes over and applies localized energy associated with the aligned state values to the individual dots to combine different amounts of the at least said background, first and second colorants to produce a range of colors to print the color image.

2. The method of claim 1, wherein the rewritable color surface is a color electrophoretic display comprising a bistable, electrochromic, colorant susceptible to localized electric fields.

3. The method of claim 1, wherein the rewritable color surface comprises human skin, further comprising tattooing the skin with color electrophoretic inks to print the global periodic pattern of the local color dot pattern.

4. The method of claim 3, further comprising:
    pre-scanning the area of the human skin on which the rewritable color surface will be formed and storing the scan as a skin template.

5. The method of claim 4, further comprising:
    using the skin template to print a skin texture and color on the rewritable surface outside the boundary of the printed color tattoo to resemble the original skin.

6. The method of claim 4, further comprising:
    using the skin template to print a skin texture and color on the entire rewritable color surface to resemble the original skin to effectively erase the color tattoo.

7. The method of claim 3, further comprising:
    scanning the rewritable color surface tattooed onto the human skin and storing the scan as a pattern template, said alignment subsystem using the pattern template to correct alignment of the state values to the individual color dots tattooed onto the human skin.

8. The method of claim 1, wherein the navigation subsystem uses the sensed alignment markers to position the applicator in the current scan.

9. The method of claim 1, wherein the second print head prints position markers along the current scan, said navigation subsystem senses the position markers in the next scan to determine the absolute position within the local color dot pattern of the applicator.

10. The method of claim 1, wherein said navigation subsystem comprises a navigation sensor that passes over the surface prior to said first print head to sense position markers on the surface.

11. The method of claim 10, wherein second print head prints said position markers along the current scan and said navigation sensor senses the position markers during the next scan to determine applicator position.

12. A rewritable color paint ink kit, comprising:
   a rewritable color surface, said surface including a global pattern of a local color dot pattern, said local color dot pattern comprising two or more different color dots in which at least a first said color dot includes a background colorant and a first colorant and a second said color dot includes the background colorant and a second colorant different from said first colorant, said surface responsive to the application of localized energy to change a persistent state of individual color dots, and
   an applicator configured for scanning over the rewritable color surface, said applicator comprising:
      a memory storing a color image, said color image comprising state values for the color dots;
      a navigation subsystem for positioning the applicator within the global pattern and determining the state values for a corresponding portion of the color image on said surface; and
      first and second print heads separated by a visible band sensor, each said print head including multiple heads that produce localized energy,
         said first print head configured to apply localized energy to at least some of the local dot patterns to change their persistent state to a nominal on state to provide alignment markers,
         said visible band sensor configured to sense the alignment markers to determine an absolute position within the local color dot pattern on the rewritable color surface and to align the state values for the corresponding portion of the color image to the individual color dots in the local dot patterns on said surface, and
         said second print head configured to apply localized energy associated with the aligned state values to the individual dots to combine different amounts of the at least said background and first and second colorants to produce a range of colors to print the color image.

13. An applicator for printing a color image onto a rewritable color surface, said surface including a global pattern of a local color dot pattern, said local color dot pattern comprising two or more different color dots in which at least a first said color dot includes a background colorant and a first colorant and a second said color dot includes the background colorant and a second colorant different from said first colorant, said surface responsive to the application of localized energy to change a persistent state of individual color dots, said applicator configured for scanning over the rewritable color surface, said applicator comprising:
   a memory storing a color image, said color image comprising state values for the color dots;
   a navigation subsystem for positioning the applicator within the global pattern and determining the state values for a corresponding portion of the color image on said surface; and
   first and second print heads separated by a visible band sensor, each said print head including multiple heads that produce localized energy,
      said first print head configured to apply localized energy to at least some of the local dot patterns to change their persistent state to a nominal on state to provide alignment markers,
      said visible band sensor configured to sense the alignment markers to determine an absolute position within the local color dot pattern on the rewritable color surface and to align the state values for the corresponding portion of the color image to the individual color dots in the local dot patterns on said surface, and
      said second print head configured to apply localized energy associated with the aligned state values to the individual dots to combine different amounts of the at least said background and first and second colorants to produce a range of colors to print the color image.

* * * * *